United States Patent [19]
Huang et al.

[11] Patent Number: 5,881,056
[45] Date of Patent: Mar. 9, 1999

[54] METHOD AND APPARATUS OF A MULTI-CODE CODE DIVISION MULTIPLE ACCESS RECEIVER HAVING SHARED ACCUMULATOR CIRCUITS

[75] Inventors: Howard C. Huang, Red Bank Township, Monmouth County; Chih-Lin I, Manalapan Township, Monmouth County; Andrzej Partyka, Bedminster Township, Somerset County; Stephan ten Brink, Holmdel Township, Monmouth County; Charles Albert Webb, III, Rumson Township, Monmouth County, all of N.J.

[73] Assignee: Lucent Technologies Inc., Murray Hill, N.J.

[21] Appl. No.: 700,257

[22] Filed: Aug. 20, 1996

[51] Int. Cl.[6] ............................. H04B 7/216; H04J 13/04
[52] U.S. Cl. ............................................ 370/335; 370/342
[58] Field of Search ............................... 370/208, 209, 370/320, 335, 342, 441, 479, 468; 375/200, 206, 208, 349

[56] References Cited

U.S. PATENT DOCUMENTS

| | | | |
|---|---|---|---|
| 5,291,515 | 3/1994 | Uchida et al. | 375/200 |
| 5,365,544 | 11/1994 | Schilling | 370/342 |
| 5,373,502 | 12/1994 | Turban | 370/441 |
| 5,490,165 | 2/1996 | Blankeney, II et al. | 370/335 |
| 5,577,025 | 11/1996 | Skinner et al. | 370/209 |
| 5,596,571 | 1/1997 | Gould et al. | 370/335 |

*Primary Examiner*—Douglas W. Olms
*Assistant Examiner*—Seema S. Rao

[57] ABSTRACT

A Multi-Code (MC) Code Division Multiple Access (CDMA) receiver receives N (where N>1) encoded signal channels over multiple air signal paths. The MC-CDMA receiver receives and demodulates the N encoded signal channels into N signal samples and includes a common circuit for time-sharing an accumulator, for accumulating the N signal samples, among a plurality of second correlators. Each of the plurality of second correlator means utilizes the time-shared accumulator to accumulate samples from each of the N signals which are then decoded into an associated one of the N signal channels.

12 Claims, 10 Drawing Sheets

METHOD AND APPARATUS OF A MULTI-CODE CODE DIVISION MULTIPLE ACCESS RECEIVER HAVING SHARED ACCUMULATOR CIRCUITS

CROSS-REFERENCE TO RELATED APPLICATIONS

Related subject matter is disclosed the concurrently filed application entitled "METHOD AND APPARATUS OF A MULTI-CODE CODE DIVISION MULTIPLE ACCESS RECEIVER USING A SINGLE DATA CORRELATOR" by S. ten Brink, H. C. Huang, C.-L. I, and C. A. Webb III, Ser. No. 08/700,262, filed Aug. 20, 1996, now pending and the previously filed application entitled "MULTI-CODE CODE DIVISION MULTIPLE ACCESS RECEIVER," by C.-L. I, A. Partyka, and C. A. Webb III, Ser. No. 08/678,834 Jul. 12, 1996, now U.S. Pat. No. 5,737,326, both of which are assigned to the same Assignee.

FIELD OF THE INVENTION

This invention relates to Multi-Code (MC) Code Division Multiple Access (CDMA) receivers and, more particularly, to a MC-CDMA receiver which uses a single data correlator.

BACKGROUND OF THE INVENTION

Code Division Multiple Access (CDMA) has gained significant attention in recent years as the up and coming technology for wireless networks. In spite of a multitude of advantages this technology offers, conventional CDMA systems have very limited user throughput and are not well suited to "bandwidth on demand" multimedia applications. To accomodate such greater bandwidth applications, a Multi-Code CDMA (MC-CDMA) system was proposed and is the subject of U.S. Pat. No. 5,442,625, entitled "Code Division Multiple Access System Providing Variable Data Rate Access To A User," issued on Aug. 15, 1995. A straightforward implementation of a receiver for the MC-CDMA system may be significantly more complex than a receiver for a conventional CDMA system. Care must be taken to avoid increasing the complexity of the receiver by a factor of N in order to support N channels.

A patent application entitled "AN IMPROVED MULTI-CODE CODE DIVISION MULTIPLE ACCESS RECEIVER," by C.-L. I, C. Webb, and A. Partyka, Ser. No. 08/678,834, filed on Jul. 12, 1996, described an MC-CDMA receiver which exploits inherent timing and synchronization characteristics of any MC-CDMA system. Specifically, the receiver design tracks and acquires multiple code channels with a single timing and synchronization unit.

Notwithstanding the improvements provided in that application, there is a continuing need to further reduce the cost and power consumption at both the transmitter and receiver locations. Increases in cost and power consumption are of particular concern for mobile terminals.

SUMMARY OF THE INVENTION

In accordance with the present invention, we have further reduced the circuitry and associated cost and power consumption of a Multi-Code (MC) Code Division Multiple Access (CDMA) receiver for receiving N (where N>1) encoded signal channels over multiple air paths. Our MC-CDMA receiver receives and demodulates the N encoded signal channels into N signal samples and includes a common circuit for time-sharing an accumulator, for accumulating the N signal samples, among a plurality of second correlators. Each of the plurality of second correlator means utilizes the time-shared accumulator to accumulate samples from each of the N signals which are then decoded into an associated one of the N signal channels.

One embodiment includes a base-code Walsh generator or a multi-code Walsh generator which is shared among the N signal channels for generating the N signal samples. Another embodiment includes a FWHT block for processing signals from the data correlators. All embodiments include a first correlator for acquiring timing information for use by the data correlators.

DETAILED DESCRIPTION

Figure 1:
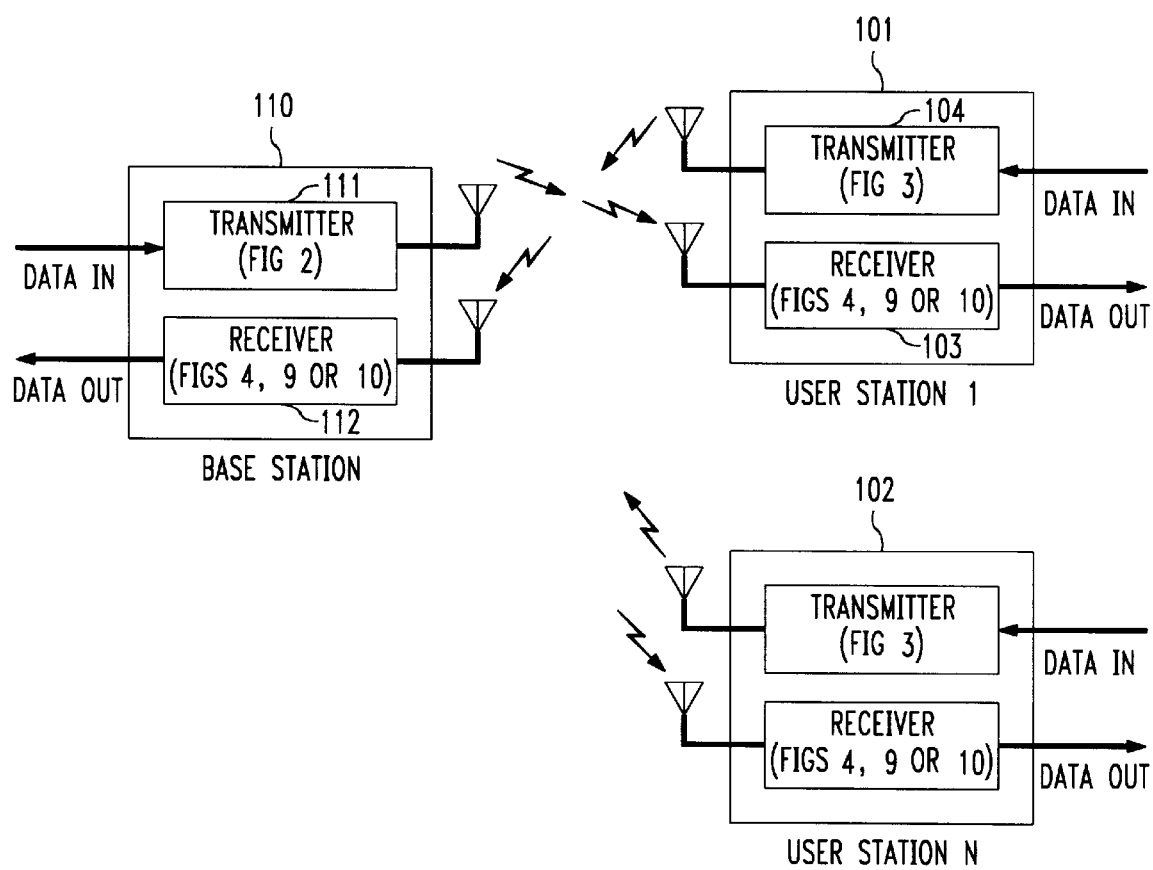
FIG. 1 shows a typical MC-CDMA system useful in explaining the operations of the present invention.

With reference to FIG. 1, we describe a typical MC-CDMA system in which the present invention may be utilized. The system includes a plurality of mobile user stations (1 . . . K), shown as 101–102, which enables a plurality of users (1 . . . K) to communicate with a base station unit 110 at one cell site. The base station 110 includes a transmitter 111 for transmitting data in a forward link to each of the user stations 101–102, and a receiver 112 for receiving data in a reverse link from each of the user stations 101–102. Transmitter 111 is implemented as a non-coherent transmitter, as shown in FIG. 2, while receiver 112 is a non-coherent receiver implemented using a combination of the circuits shown in FIGS. 4 and 8.

Each of the user stations 101–102 include a forward link receiver 103 and a reverse link transmitter 104. The receiver, e.g.,103, is implemented as a coherent receiver using a combination of the circuits shown in FIGS. 4, 5 and 8. The transmitter is implemented as a non-coherent transmitter using the circuit shown in FIG. 3. The air space between the base station 110 and the user stations 101–102 usually provide a multipath environment for both the forward and reverse link communications.

Figure 2:
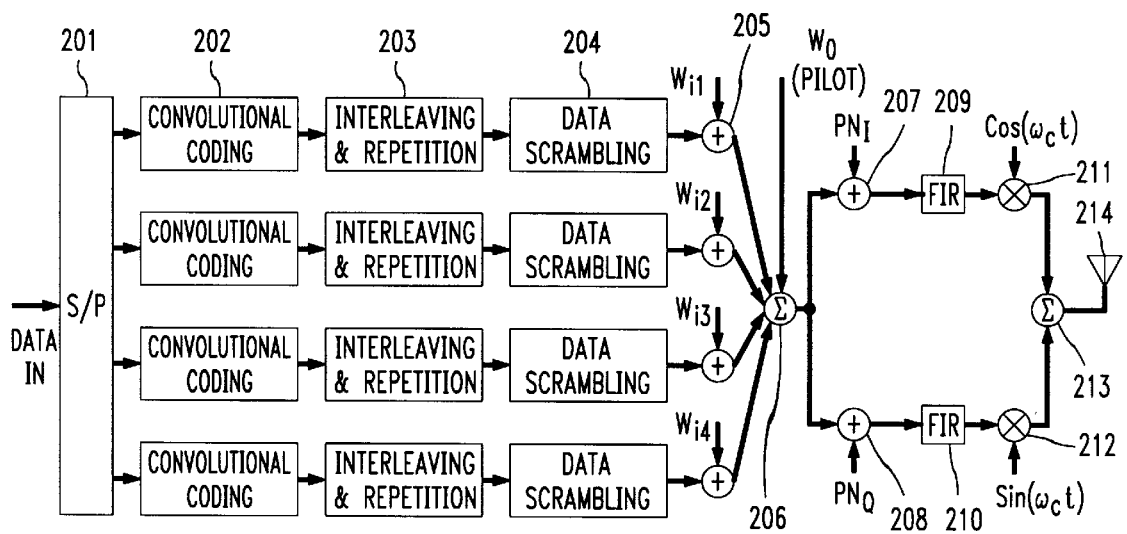
FIG. 2 shows a simplified block diagram of an illustrative four channel MC-CDMA coherent (typically forward link) transmitter that can be used in the system of FIG. 1.

Shown in FIG. 2 is a simplified block diagram of an illustrative four channel MC-CDMA transmitter 111 which may be used at a base station to provide a coherent MC-CDMA link between the base station 110 and the user stations 101–102. Data is received at a serial-to-parallel unit 201 which converts a user's serial digital data input into, illustratively four data streams, each of which is encoded using a convolutional coder, e.g., 202. The output of each convolutional coder is then coupled to an interleaver circuit, e.g., 203, and then to a data scrambler, e.g., 204. The output of each data scrambler is then coupled to a code spreader, e.g., 205, which spreads the data bit rate signal into a channel bit rate using a different one of the Walsh codes $W_{i1}$–$W_{i4}$. A summer or combiner 206 combines the outputs of the code spreaders with a Walsh code pilot signal $W_0$. The Walsh code pilot signal $W_O$ is the signal that is detected at the receiver, e.g., 101, to enable the coherent operation of the forward link.

The output of combiner 206 is coupled to coders 207 and 208. In coder 207, an in-phase code $PN_I$ further encodes the output signal from combiner 206. In coder 208, a quadrature-phase code $PN_Q$ further encodes the output signal from combiner 206. The outputs from coders 207, 208 are each filtered by FIR filters, 209 and 210 respectively. The outputs of the FIR filters 209 and 210 are then up-converted by modulators 211 and 212 using radio carrier frequency signals $\cos(\omega_c t)$ and $\sin(\omega_c t)$, respectively. The output of modulators 211 and 212 are radio frequency signals which are combined in combiner 213 and transmitted via antenna 214 over the air to the user stations 101–102.

Figure 3:
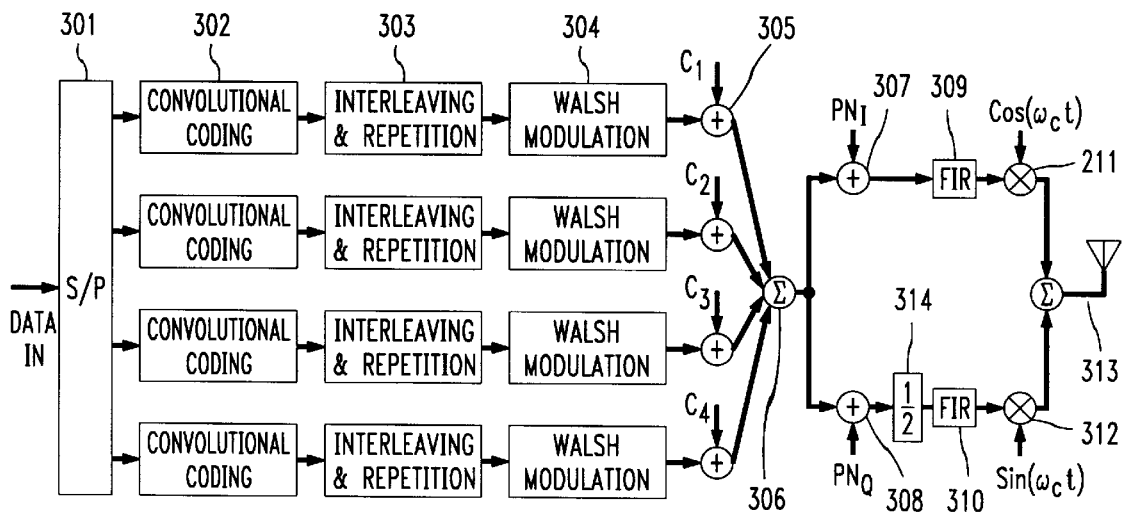
FIG. 3 shows a simplified block diagram of an illustrative four channel MC-CDMA non-coherent (typically reverse link) transmitter that can be used in the system of FIG. 1.

Shown in FIG. 3 is a simplified block diagram of an illustrative four channel MC-CDMA transmitter 111 which, illustratively, is used at user station s 101–102 to provide a non-coherent MC-CDMA link to the base station 110. User data is received at a serial-to-parallel unit 301 which converts a user's serial digital data input into, illustratively four data streams, each of which is encoded using a convolutional coder, e.g., 302. The output of each convolutional coder is then coupled to an interleaver circuit, e.g., 303, and then to a Walsh modulator circuit, e.g., 304. The output of each Walsh modulator circuit is then coupled to a code spreader, e.g., 305, which spreads the data bit rate signal into a channel bit rate using a different one of the codes $C_1$–$C_4$. These codes are derived from the user Long PN code via subcode concatenation. A summer or combiner 306 combines the outputs of the code spreaders which is then coupled to coders 307 and 308. Since no pilot signal is added in combiner 306, transmission is non-coherent in the reverse link.

In coder 307, an in-phase code $PN_I$ further encodes the output signal from combiner 306. In coder 308, a quadrature-phase code $PN_Q$ further encodes the output signal from combiner 306. The output from coder 307 is filtered by FIR filter 209. The output from coder 308 is divided in half by divider 314 and then filtered by FIR filter 210. The outputs of the FIR filters 309 and 310 are then up-converted by modulators 311 and 312 using radio frequency signals $\cos(\omega_c t)$ and $\sin(\omega_c t)$, respectively. The output of modulators 311 and 312 are radio frequency signals which are combined in combiner 313 and transmitted via antenna 314 over the air to the user stations 101–102.

For both the forward link of FIG. 2 and the reverse of FIG. 3 there is no self-interference for a given multipath component because both the Walsh codes and the subcodes are mutually orthogonal.

Figure 4:
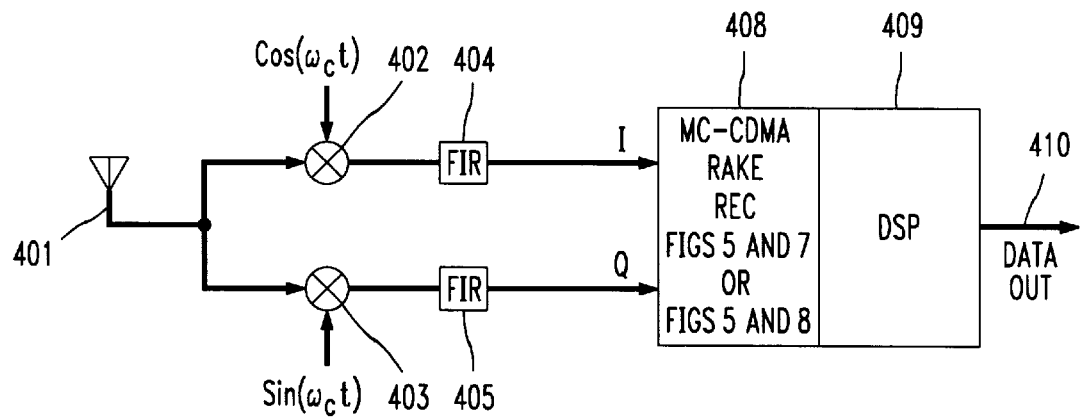
FIG. 4 shows a simplified block diagram of an illustrative four channel MC-CDMA receiver that can be used in the system of FIG. 1.

FIG. 4 shows a simplified block diagram of an illustrative four channel MC-CDMA receiver that can be used at the base station 110 or at any of the user stations 101–102 of the system of FIG. 1. The radio frequency signals received via antenna 401 are down-converted by modulators 402 and 403, using radio frequency signals $\cos(\omega_c t)$ and $\sin(\omega_c t)$, respectively. The output of demodulators 402 and 403 are each filtered by an anti-aliasing LPF (Low Pass Filter) 404 and 405, respectively to produce a resulting baseband I and Q signals. The I and Q signals, are then further decoded and despreaded by a MC-CDMA RAKE receiver 408 operating under control of Digital Signal Processor (DSP) 409 to produce the output data signal 410. The DSP forms a weighted average of each of the data signals received by a different finger, where each finger tracks a different multipath component. A RAKE receiver is an optimum mechanism for receiving signals in a multipath environment.

Before we discuss the embodiment of our MC-CDMA RAKE receiver, we first review the operations of a prior art CDMA RAKE receiver. A RAKE receiver is an optimum mechanism for receiving signals in a multipath environment. An illustrative example of a receiver is described in the following references 1) "A Communication Technique for Multipath Channels" by R. Price and P. E. Green Jr.; Proceedings IRE, Vol. 46, Pages 555–570, March, 1958

2) "Introduction to Spread Spectrum Anti-multipath Technique and Their Applications to Urban Digital Radio" by G. L. Turin; Proceedings IEEE, Vol. 68, No. 3, Pages 328–353, March, 1980

3) "Digital Communications" by J. G. Proakis; McGraw-Hill, 1989

Figure 5:
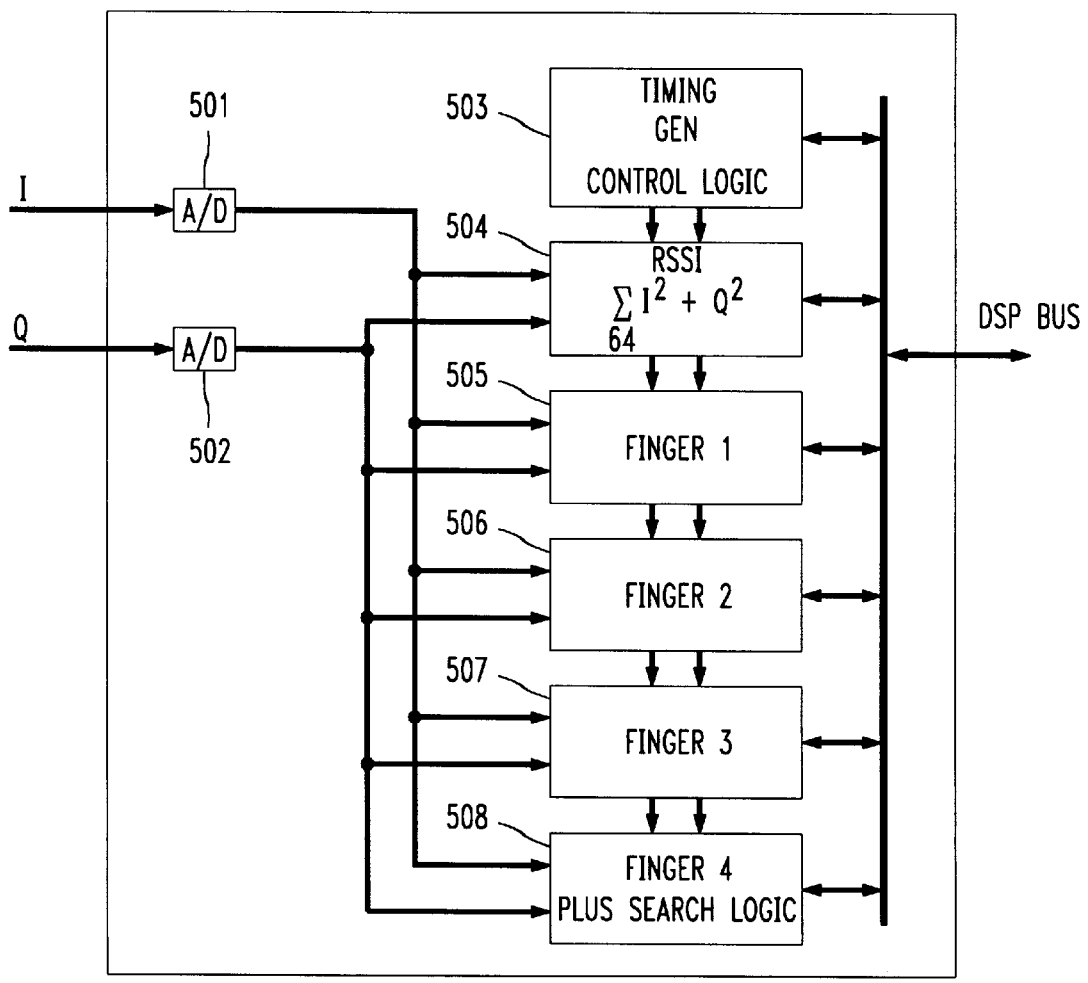
FIG. 5 shows a prior art "RAKE" receiver for a CDMA system.

FIG. 5 shows an illustrative block diagram of a prior art "RAKE" receiver typically used in a CDMA system. A RAKE receiver is used in both the forward and reverse links of a CDMA system to take advantage of the inherent time diversity in the received signals arriving via different paths of a multipath environment.

Analog I signals (I) and Q signals (Q) are converted to digital signals by the A/D circuits 501 and 502, respectively. Control logic circuit 503, provides Digital Signal Processor (DSP) interfacing and control, as well as common timing and control functions for the CDMA receiver. Control logic circuit 503 operates under control of signals received over DSP bus from a DSP, not shown. An RSSI (Received Signal Strength Indicator) block 504 calculates the total received signal power of the I and Q signals received over the various signal paths.

In the RAKE receiver, there are several mostly identical "finger" units 505–508. Each of the finger units 505–508 is used to despread/demodulate a received signal arriving over a different air path of the multipath environment. These finger units 505–508 are essentially the same except they have a different time delay, attenuation and phase characteristics. The finger unit 508 additionally includes a small amount of additional logic to allow its use as a high-speed pilot searcher (for use in coherent receivers to detect the Walsh signal pilot $W_0$, as shown in FIG. 2) and/or new data path searchers (for use in a non-coherent receiver to recover timing from a data signal).

Figure 6:
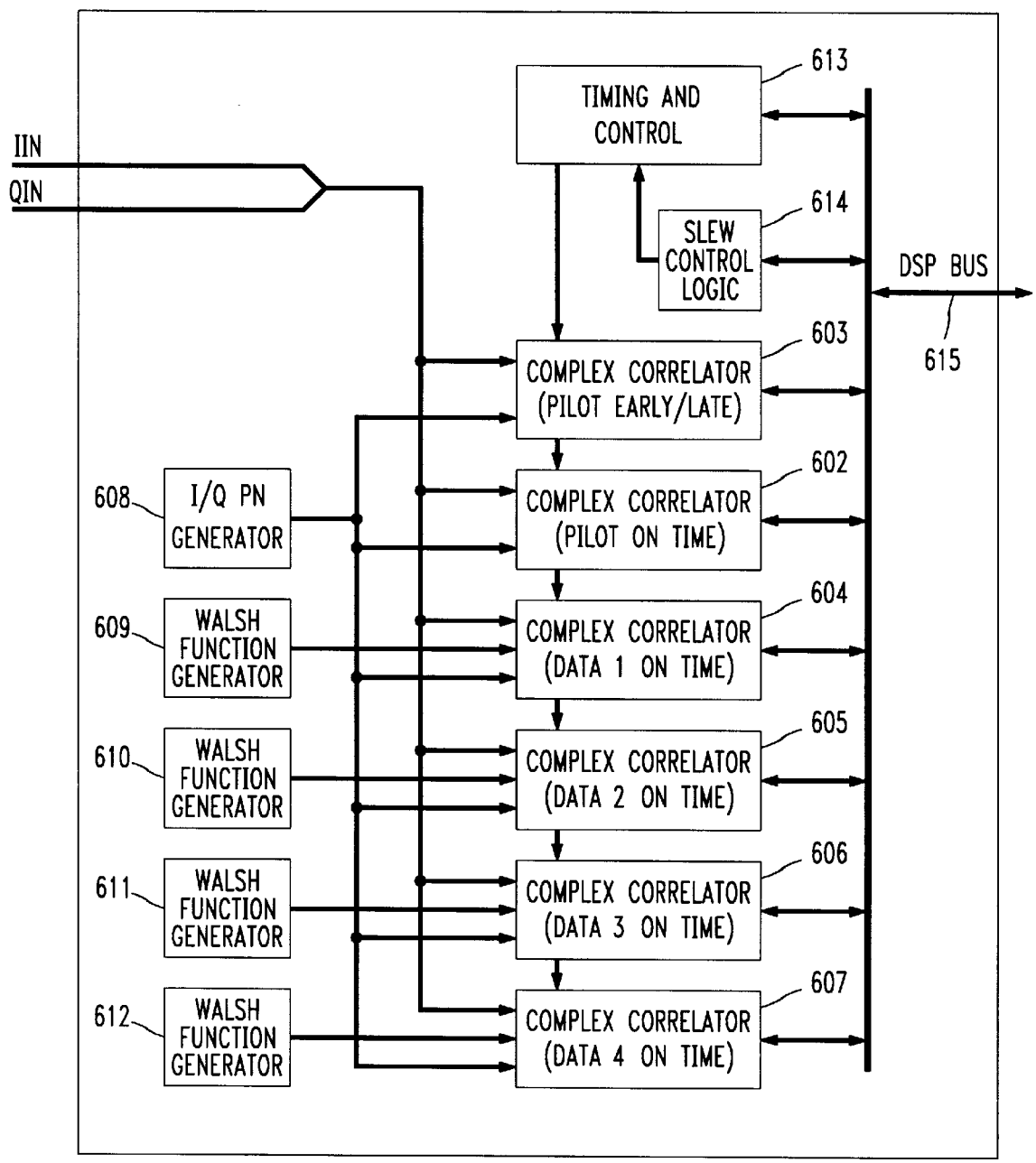
FIG. 6 shows a "Fat Finger" design of an illustrative four channel coherent MC-CDMA receiver in accordance with the previously-identified patent application.
Figure 7:
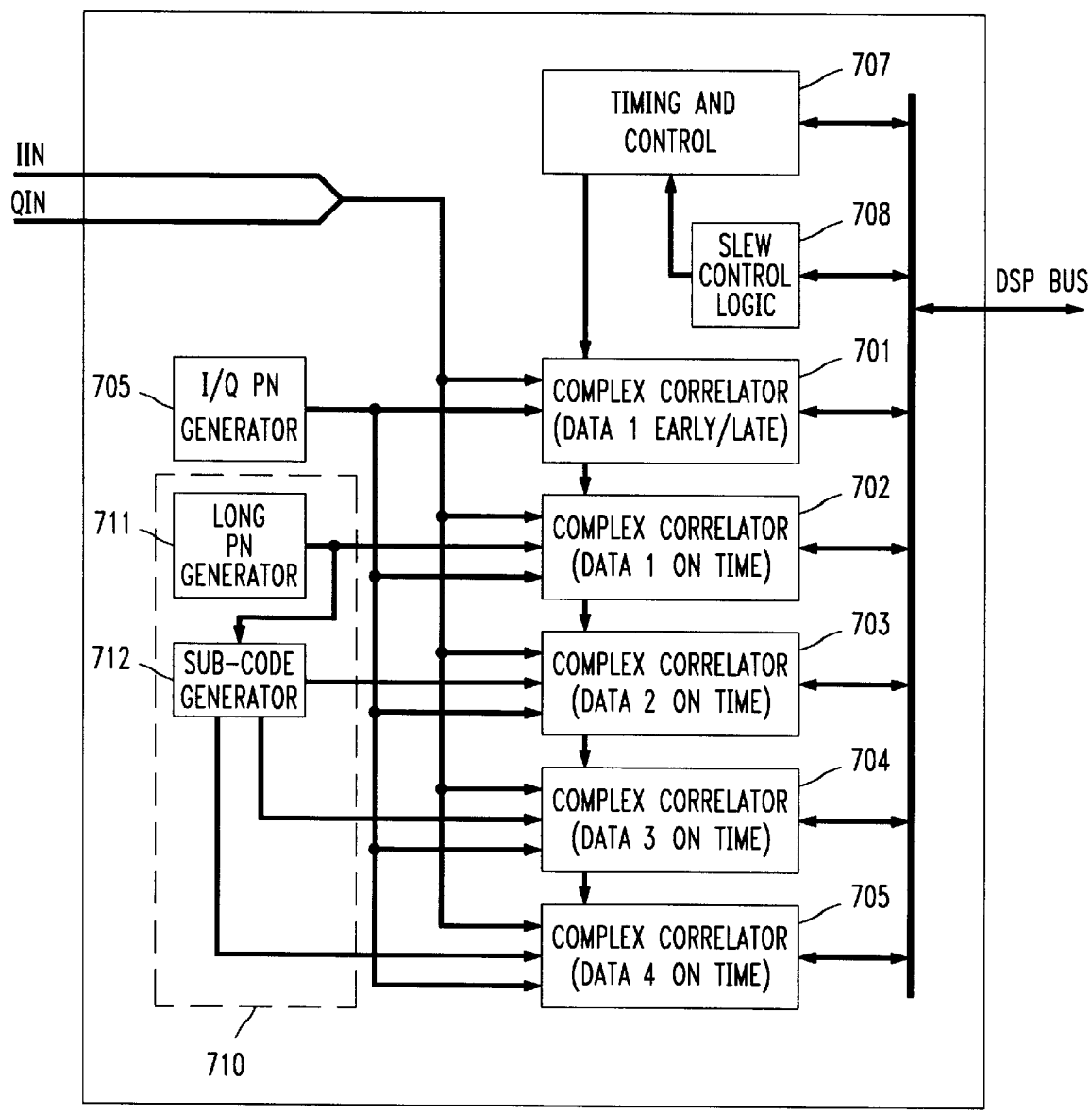
FIG. 7 shows a "Fat Finger" architecture for an illustrative four channel non-coherent MC-CDMA receiver in accordance with the previously-identified patent application.

The previously-referenced application, used the "Fat Fingers" design of FIG. 6 or FIG. 7 for each of the fingers 505–508 to provide, respectively, a coherent or non-coherent MC-CDMA receiver. Much of the search logic in finger unit 508, the RSSI block 504, and much of the common control logic 503 remained unchanged. The DSP bus is used to distribute the data signals from finger units 505–508 and control logic circuit 503 to the DSP (not shown).

In the coherent MC-CDMA Receiver of FIG. 6 used at the mobile stations, a timing information acquiring unit (timing correlator means) includes 602–604, 613, and 614. This timing correlator means is used for tracking a pilot signal of a given multipath component to acquire all of the timing necessary to despread all of the other N–1 Walsh channels processed by that finger unit. The timing correlator means uses three complex correlators, one for detecting pilot on-time 602, one for detecting pilot early/late 603 and one for data-on-time 604 (which together recover the timing signals). Since N=4 in the example of FIG. 6, the decoding and despreading of data received over 4 Walsh channels uses 4 complex correlators 604–607. The data output of correlators 604–607 are then outputted over DSP bus to a DSP unit, not shown.

The I/Q PN generator 608 provides input codes to the correlators 603–607. The Walsh function generators 609–612 provides a Walsh codes to the data correlators 604–607. Control circuit 613 and slew control logic 614 provide control signals for the operation of the RAKE finger and also interface to the DSP bus.

Additionally, the design allows for the possibility that the forward channel may contain independent information in the received I and Q channels. In that case, a slightly different complex correlator may be used to distinguished the data on the I and Q channels independently, thus further doubling the user data rate.

Similarly for the non-coherent MC-CDMA receiver of FIG. 7 used at the base station, a timing information acquiring unit (timing correlator means) includes units 701, 702, 707, and 708. The timing correlator means is used to track and acquire timing information for a single reverse channel subcode. Since there is no pilot signal, the receiver is non-coherent and timing is derived directly from the data signal. This timing information was then used to control the reception of and despreading of all of the remaining N–1 subcodes from a given user mobile station. It is important to note that the same observation holds true in general for any coherent or non-coherent receiver of any MC-CDMA system.

The complex correlators include a data early/late correlator 701 and 4 data-on-time correlators 702–705. The I/Q PN generator 706 provides input codes to the correlators 701–705. Note that for this receiver channelization can be achieved either through subcodes concatenation (as shown by 710, 711 and 712) or through simple aggregation of Long PN codes (i.e., by using a separate Long PN generator 711 for each complex correlator 702–705).

In accordance with the present invention, we have recognized how to design an enhanced MC-CDMA receiver which takes advantage of properly chosen Walsh codes (i.e., $W_{i1}$–$W_{i4}$ of FIG. 2) which are used to encode the user's MC-CDMA signal. The coherent MC-CDMA receiver of FIG. 6 works with any combination of Walsh codes but is more hardware complex than that of the present invention. The required relationship between the Walsh codes, as we will propose it in this document, is simple and is not a disadvantageous constraint in practical CDMA systems. The significant improvement refers to the data correlators: Instead of using N complete complex data correlators (as in FIG. 6), we apply a combined design which operates with a single complex correlator and a Fast Walsh-Hadamard Transformation (FWHT) postprocessing stage using N intermediate correlation results to obtain N data correlator outputs. Such a technique significantly reduces the number of operations needed to obtain the N data correlator outputs. If we assume a MC-CDMA receiver supporting N simultaneous channels the number of complex additions drops from $N \times N_C$ to $N_C + N \times \log_2 N$ in a non-coherent implementation, and from $N \times N_C$ to $N_C + N/2 \times \log_2 N$ in a coherent one.

In the following description, we use this terminology:

a CDMA-channel x is a channel using a single Walsh code a MC-CDMA signal for user k consists of N single CDMA-channels and thus is using a set of Walsh codes W(k,i), with i=0 . . . N–1. Where W(k,0) is referred to as "Base-Walsh code" for user k since all other Walsh codes W(k,i) of user k's MC-CDMA signal are derived from it $W_i$ is the i-th out of the set of $N_c$ orthogonal Walsh codes; i=0 . . . $N_c$–1

$N_c$ is referred to as the number of chips per symbol, which is equal to the order or length of the Walsh codes $R_c$ is referred to as the chip-rate; in IS-95 the chip-rate is 1.2288 Mcps $R_b$ is referred to as the bit-rate or symbol-rate; in IS-95 the symbol-rate is 19.2 kbps; the chip-rate is the symbol-rate times the spreading gain (64 in IS-95)

CONSTRUCTION OF WALSH CODES

To distinguish between several users, Walsh codes are applied in a multiple access CDMA-system like the IS-95 forward link shown in FIG. 1. Since the Walsh codes are orthogonal to each other, it is guaranteed that there is no multi-access interference.

The Walsh codes of order M are based on the Walsh-matrix $W^M$, a square M×M matrix with M being a power of two. For example $$W^1 = [0], \; W^2 = \begin{bmatrix} 0 & 0 \\ 0 & 1 \end{bmatrix} \; W^4 = \begin{bmatrix} 0 & 0 & 0 & 0 \\ 0 & 1 & 0 & 1 \\ 0 & 0 & 1 & 1 \\ 0 & 1 & 1 & 0 \end{bmatrix}, \text{etc.}$$

The recursive generation rule for the Walsh-matrix of order 2M is:

$$W^{2M} = \begin{bmatrix} W^M & W^M \\ W^M & \overline{W}^M \end{bmatrix} = \begin{bmatrix} \frac{M}{W2} & \frac{M}{W2} & \frac{M}{W2} & \frac{M}{W2} \\ \frac{M}{W2} & \frac{M}{\overline{W}2} & \frac{M}{W2} & \frac{M}{\overline{W}2} \\ \frac{M}{W2} & \frac{M}{W2} & \frac{M}{\overline{W}2} & \frac{M}{\overline{W}2} \\ \frac{M}{W2} & \frac{M}{\overline{W}2} & \frac{M}{\overline{W}2} & \frac{M}{W2} \end{bmatrix}$$

The M rows of the Walsh-matrix of order M are the orthogonal Walsh codes $W_i$ with length $N_C=M$. Each higher order Walsh code is built recursively of lower order Walsh codes.

The following paragraphs explain the required relationship between the Walsh codes to allow a simplified MC-CDMA receiver implementation.

In the MC-CDMA receiver of the previously-identified patent application, it was necessary to perform N complex data correlations to demodulate the MC-CDMA signal of user k. We have recognized that by restricting ourselves to properly chosen Walsh codes, we can make use of the construction rule of the Walsh codes and share intermediate correlator results. These intermediate results are stored and used to perform a Fast Walsh-Hadamard Transformation (FWHT) (see H. Harmuth, "Transmission of Information by Orthogonal Functions", Springer-Verlag, New York 1969). As a result, instead of using N complete complex correlators we only need a single one with a FWHT-postprocessing stage.

First we divide a Walsh code into N segments of equal lengths $N_C/N$ (recall, we want to have N channels for one user k), where N is a power of two and N is<or=to $N_C$. Since $N_C=M$ is also a power of two (i.e., $2^i$ where i is=or>than 0), we get a number $N_C/N$ of sub-Walsh codes which is again a power of two. The required relationship within a set of Walsh codes used for encoding the MC-signal for user k is $$W(k,i) = W_{k+i \, Nc/N}$$

with the user number $k=0 \ldots N_C/N-1$ and the Walsh code channel index $i=0 \ldots N-1$.

According to the above mentioned relationship we get $N_C/N$ Walsh codes $W(k,i)$ of length $N_c$. Each code $W(k,i)$ consists of N sub-Walsh codes of length $N_C/N$ which are arranged according to a Walsh code of order N. We call this lower-order Walsh code the "overlayed Walsh code". As we will see in the implementation discussion, the sequential complex correlation is performed on the sub-Walsh codes of length $N_C/N$, where the FWHT is performed on the overlayed Walsh code of order N.

To illustrate the overlayed Walsh code $W(k,i)$, it may be N=4, $N_C=M$ any power of 2 which is less than or equal to 2 (since N is<or=to $N_C$).

The Walsh codes $W(k,i)$ for providing 4 channels for a user k's MC-CDMA signal are constructed like the following:

$W(k,0) = [AAAA]$ $W(k,1) = [A\overline{A}A\overline{A}]$ $W(k,2) = [AA\overline{A}\overline{A}]$ $W(k,3) = [A\overline{A}\overline{A}A]$ The symbol A stands for the sub-Walsh code of length $N_c/N$ on which the sequential correlation is performed. All the Walsh codes in the set $W(k,i)$ are built of the sub-Walsh codes A or $\overline{A}$ respectively according to the overlayed Walsh code of order (or length) N=4. Now we can share the N=4 intermediate, correlation results: These results have to be summed differently (plus or minus) to get the N data correlator outputs. This is done with a FWHT of order N, also referred to as FWHT(N).

Implementation

Figure 7A:
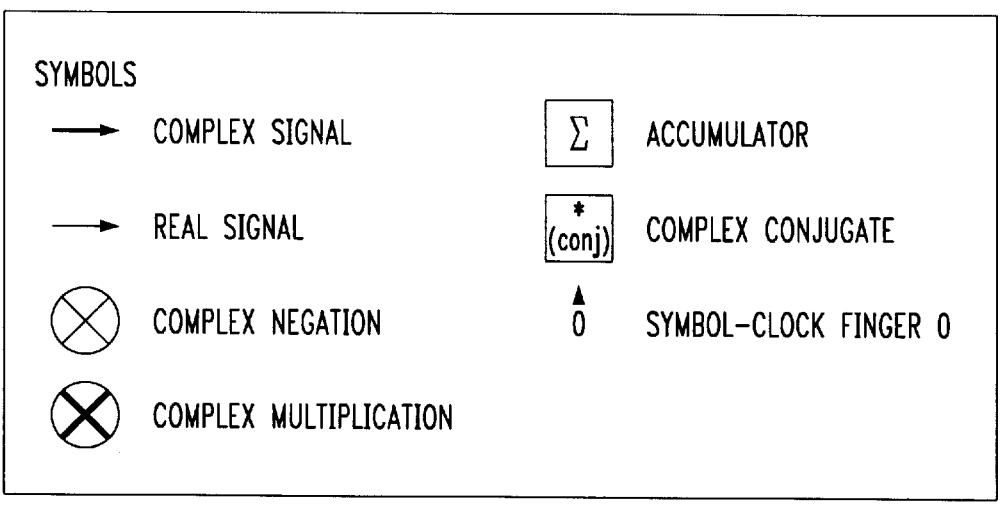
FIG. 7A shows a group of symbols used in the following figures.
Figure 8:
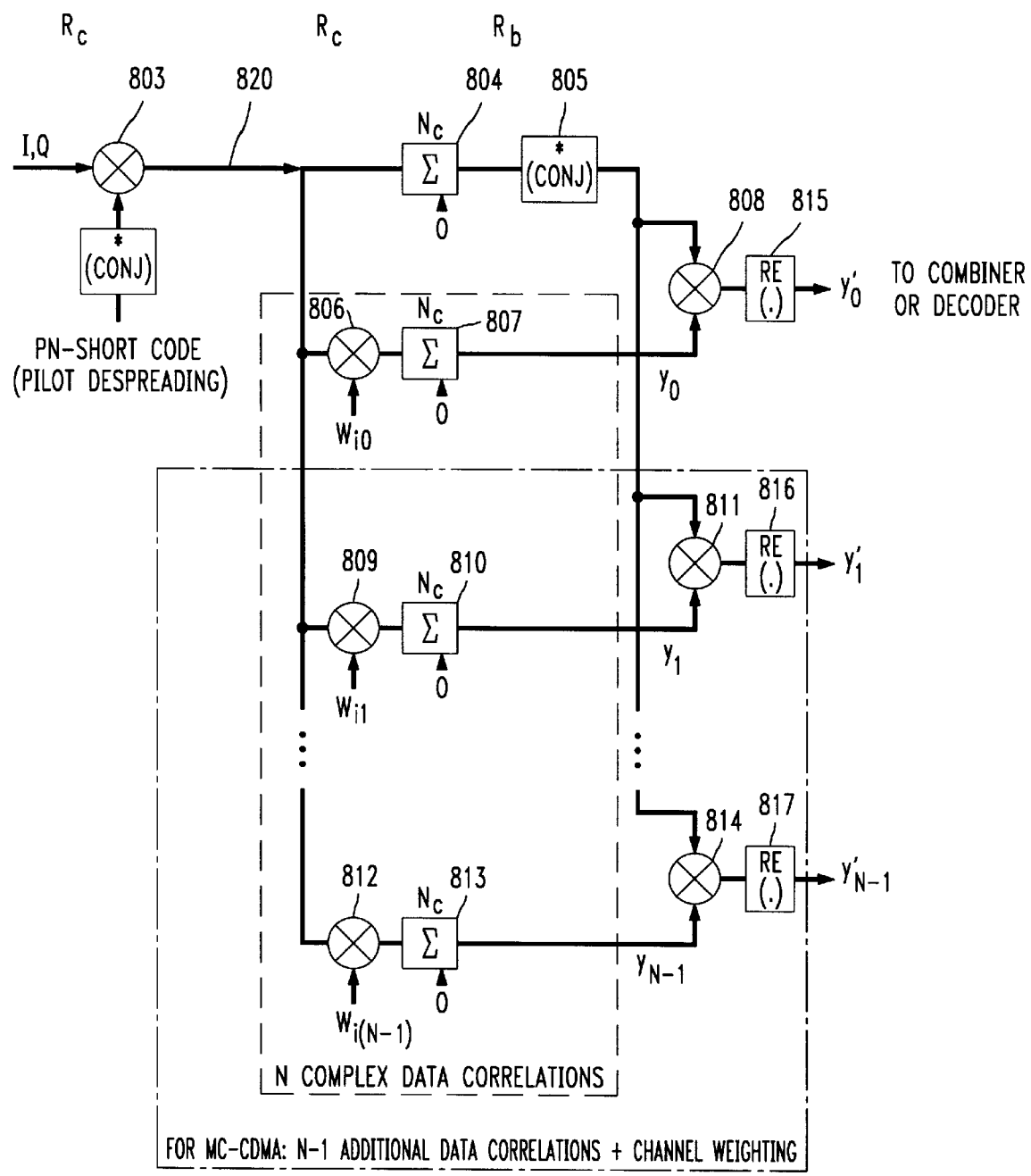
FIG. 8 shows the conventional implementation of the correlators of an N channel MC-CDMA receiver.

To understand the difference between an N channel MC-CDMA receiver of the present invention and an N channel MC-CDMA receiver of the previously-identified patent application, we reference FIG. 8 which shows a more detailed schematic drawing of the complex data correlators of an N channel MC-CDMA receiver for a User k. The drawing of FIG. 8, as well as the drawings of subsequent figures, utilize the symbols shown in FIG. 7A. It should be noted that only one finger of a multipath combining Rake Receiver (MC-CDMA) is shown in FIG. 8. Typically a Rake Receiver consists of at least 3 demodulator fingers (as shown by 601, 602, and 603 in FIG. 6).

With joint reference to FIGS. 6 and 8 a comparison is made between the schematic of FIG. 8 and its block diagram shown in FIG. 6. The I/Q generator 608 generates the signal 801 input. The Walsh function generator, e.g., 609, generates the Walsh codes $W_{i0}-W_{i\,(N-1)}$. The timing recovery units (pilot early/late correlator) are not shown in FIG. 8 since they are not important for describing the invention and furthermore not different from other receiver designs. The channel weighting multiplications (FIG. 8, 808, 811, 814) are not shown in FIGS. 6, 7 since they are assumed to be performed in a DSP there. FIG. 8, however, is more general in terms of explaining the signal processing algorithms without considering wether the operation takes place in DSP or an ASIC.

Complex conjugation is performed by 802, and 805. Complex negation is performed by 803, 806, 809, and 812. Accumulation is performed by accumulators 804, 807, 810, and 813 at a symbol-clock rate. The accumulator 804 and complex conjugation 805 implement any of the well known channel estimation averaging algorithms which is then applied to the complex multipliers 808, 811, and 814 and function Blocks [Re(.)] 815, 816, and 817 to produce the outputs $y_0'-y_{N-1}'$. These outputs are the real parts of the results of the complex multiplications. The outputs $y_0'-y_{N-1}'$ of FIG. 8 are further processed (multipath-combining of several demodulator outputs and decoding, not shown in FIGS. 6, 7, 8) to finally obtain the binary data information.

It should be noted that the MC-CDMA receiver of FIG. 8 uses $N \times N_C$ complex additions. However, there is no restriction on the relationship between the Walsh codes $W_{ij}$. Since the receiver architecture itself remains basically the same, our enhanced design replaces only the N complex data correlators(i.e., 806, 807, 809, 810, 812, and 813) of FIG. 8 with a single complex correlator and a real or complex FWHT unit (see the two embodiments), utilizing properly chosen Walsh codes W (k,0), as shown in FIG. 9.

Figure 9:
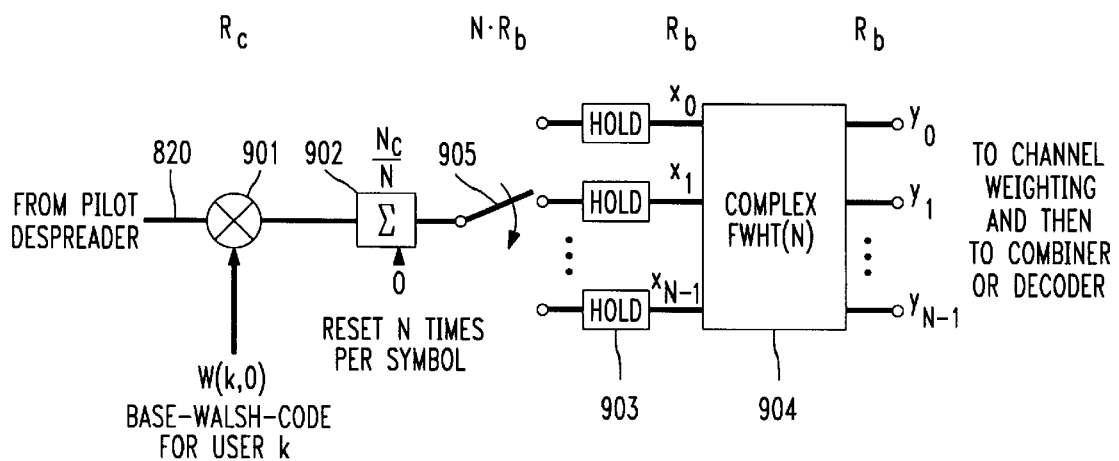
FIG. 9 shows a first embodiment of our enhanced MC-CDMA receiver including a complex FWHT circuit and using selected Walsh codes in accordance with the present invention.

With reference to FIG. 9, the complex FWHT unit 904 takes advantage of the above-mentioned construction rule for selecting Walsh codes. The complex negator 901 multiplies the Base-Walsh-code W (k,0) for user k with the pilot PN-code (PN=pseudo random noise) (820) which is then summed in accumulator 902. The accumulator 902 output is reset every $N_C/N$ input samples and the intermediate result is stored in a hold-buffers 903. The demultiplexer or switch 905 selects the particular hold-buffer that is to store a particular intermediate result. The outputs of hold buffers 903 $x_0-x_{N-1}$ are then processed by a complex FWHT-processor 904 at the symbol rate $R_b$. The outputs of 904 are $y_O-Y_{N-1}$ which are then multiplied by the channel weightings from pilot channel correlator 804 (e.g., using multipliers 808, 811, and 814) to obtain the N correlator outputs $y_O'-y_{N-1}'$. The implementation of FIG. 9 requires only $N_C+N \times \log_2 N$ complex additions compared to the $N \times N_C$ complex additions of the prior art arrangement of FIG. 8.

Figure 10:
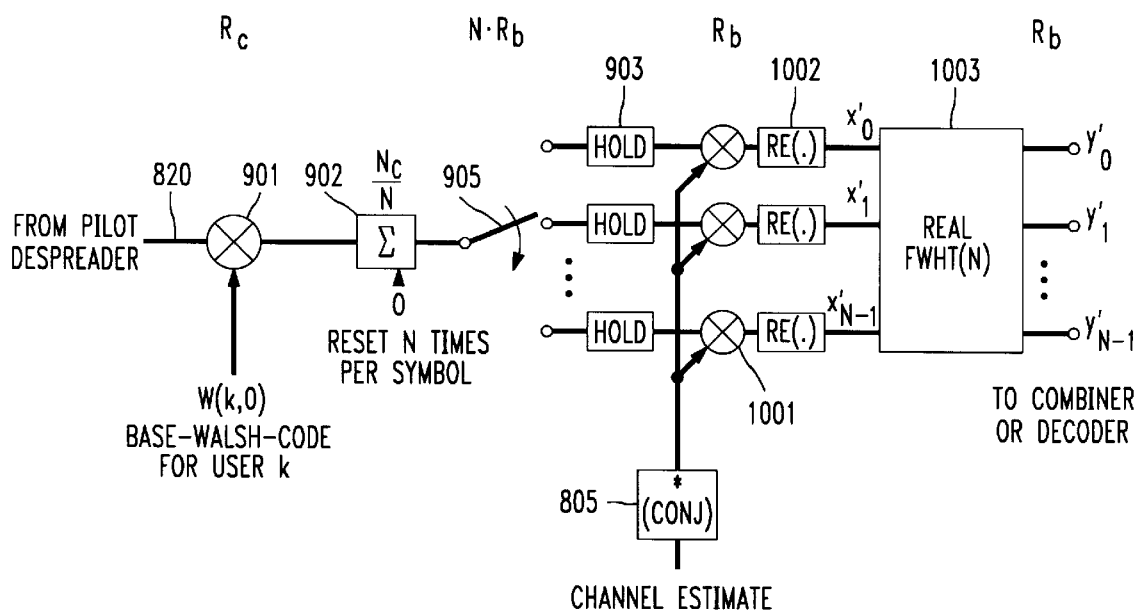
FIG. 10 shows a second embodiment of our enhanced MC-CDMA receiver using channel weighting before a real FWHT circuit and using selected Walsh codes in accordance with the present invention.

Shown in FIG. 10 is another implementation where channel weighting is performed before the FWHT processing and hence only real FWHT processing is needed in unit 904. In this embodiment, the channel weighting function (multiplication with the channel estimate obtained from the pilot channel correlator 804) is moved from the output of the FWHT-block 904 to prior to the input side of the FWHT-block 904. Thus, the output of accumulator 902 is switched, by switch 905, to the appropriate hold-buffer 903. At the appropriate time, the output from the hold-buffers 903 is multiplied by the channel estimate from complex conjugate circuit 805 in multiplier 1001. After the channel weighting, the functional blocks 1002 [Re(.)] take only the real part of the signals $x_0-x_{N-1}$, referred to as $x_0'-x_{N-1}'$ which the real FWHT-block 1003 processes to obtain the outputs $y_0-y_{N-1}$.

The advantage of the embodiment of FIG. 10 is that the real FWHT-block 1003 operates with real values instead of complex values. This arrangement also needs only $N_C+N/2 \times \log_2 N$ complex additions. Such an arrangement thus requires only $N/2 \times \log_2 N$ more complex additions and N−1 more multiplications in comparison to a single channel CDMA (non-MC-CDMA) receiver. Consequently, our finger design is almost the same size as that of the conventional non-MC demodulator finger design.

For example, with $N_C=64$, and N=4 we have $W(k,i)= W_{k+i \times 16}$ where k=0 ... 15, and i=0 ... 3. Thus, instead of 256 additions, we now have only 68 complex additions. Furthermore, we do not need N Walsh-generators. Only a single one is sufficient which is initialized with the Base-Walsh code W(k,0) of user k. If the MC-CDMA receiver design of the previously-identified patent application was termed a "Fat Finger" design, then the receiver of the present invention (a single complex data correlator with FWHT postprocessing) may be referred to as the "Skinny Fat Finger" design.

Figure 11:
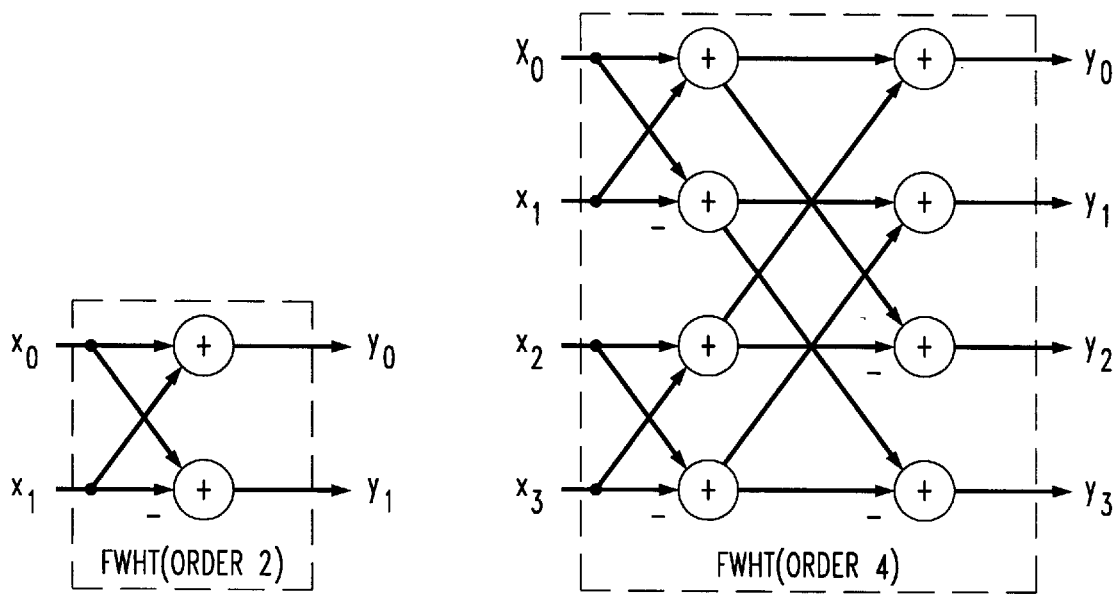
FIG. 11 shows illustrative implementations of FWHT circuits of order 2 and 4.

In the implementation of FIG. 9 MC-CDMA receiver, the Fast Walsh-Hadamard Transformation is used to take advantage of the overlayed Walsh code of order N. With reference to FIG. 11, we describe an implementation of the FWHT-Blocks of Order 2 (i.e., N=2) and 4. As shown a FWHT with N complex input values needs $N \times \log_2 N$ complex additions. A FWHT with N real input values needs $N \times \log_2 N$ real additions or $N/2 \times \log_2 N$ complex additions.

SHARING COMMON LOGIC

Figure 12:
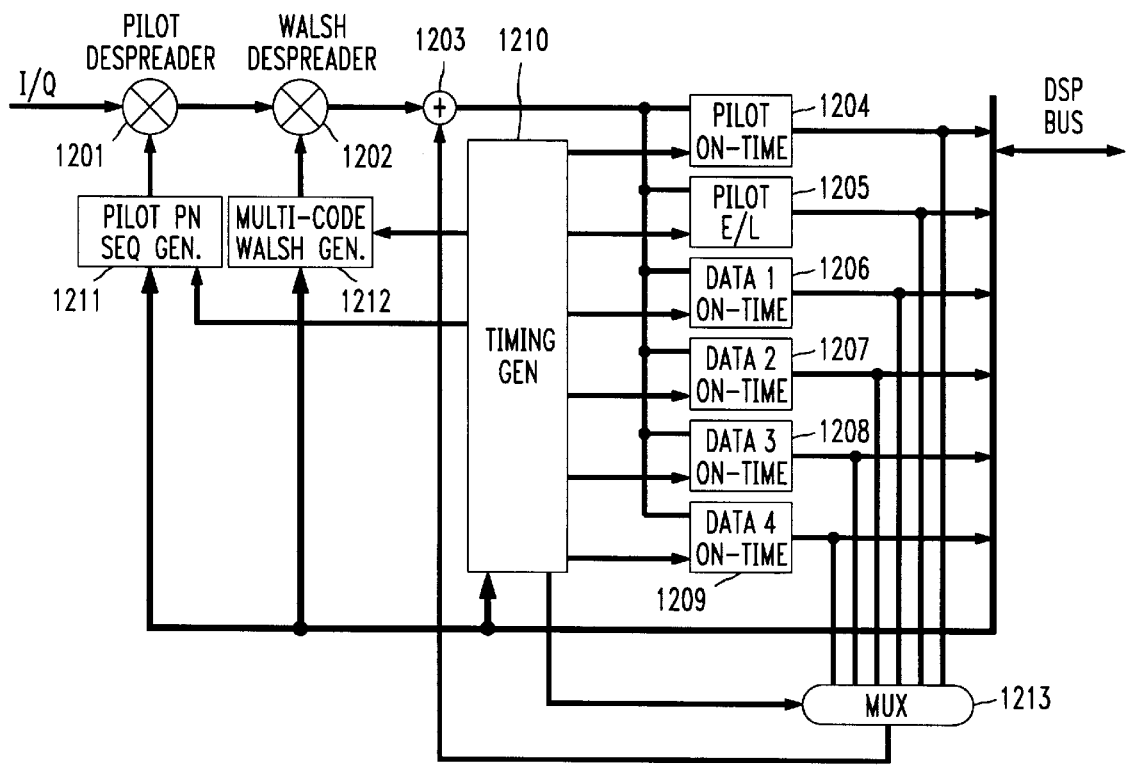
FIG. 12 shows a block diagram for a shared correlator circuit used with arbitrary Walsh codes.

In accordance with another aspect of the present invention, the hardware complexity of a MC-CDMA Rake Receiver Finger is further reduced by sharing common logic among the complex correlators within a finger. With reference to FIG. 12, this is accomplished by time-multiplexing the use of a single accumulator block 1203 to implement the accumulators for multiple complex correlators. This was done by recognizing that the higher-frequency clock signals used for the A/Ds could also be exploited to time multiplexed operations of a common adder block 1203. More particularly, we exploited the fact that existing timing generators for a finger divide a single Walsh chip period into multiple time slots or higher-frequency ticks. These time slots are necessary because the timing of the samples from the A/Ds must have finer adjustability than that of a single Walsh chip. We recognized that one accumulation for a complex correlator can occur during each of these time slots. Furthermore, this sharing or multiplexing scheme can be implemented both for systems with arbitrary Walsh codes (as used in FIG. 6) and systems with Walsh codes of order M (as used in FIG. 8). We describe both arrangements in the following paragraphs.

Shown in FIG. 12 is an illustrative block diagram of a code finger in which our sharing scheme is implemented. In this figure, we assume an MC-CDMA system with 4 basic-rate channels (N=4). We also place no restrictions on the Walsh codes used by the transmitter. There is a single complex correlator structure (shown as the pilot 1201 and Walsh 1202 despreaders) followed by an adder 1203 and six correlators 1204–1209. Within one "tick" or Walsh chip clock cycle, the current input is added to a register located in an associated one of the correlators (1204–1209) to accumulate a correlated value. The timing generator 1210 generates the necessary signals, shown in FIG. 13, to control the accumulation function performed at all six correlators in the six registers within a single Walsh chip.

Figure 13:
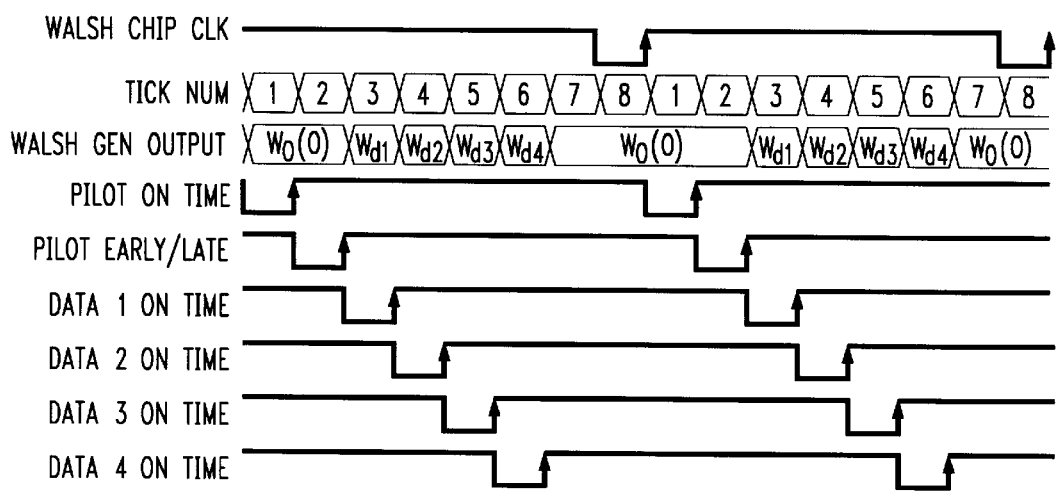
FIG. 13 shows the timing diagram for the circuit of FIG. 12.

The Pilot PN Sequence generator 1211 generates the I and Q short PN sequences at the appropriate timing offset for the particular base station. This sequence is multiplied (in a complex sense) by the input data (I/Q) in pilot despreader 1201. The Multi-Code Walsh generator 1212 creates during each. "tick", or time slot, either pilot Walsh code (which is all zeroes) or one of the arbitrary four Walsh codes. That is, during one complete Walsh chip clock cycle, a "chip" is obtained for each of the six correlators [$W_0(0)$ used by Pilot-On-Time, 1204 ... through $W_{d4}$ used by Data 4-On-Time, 1209], as shown in FIG. 13.

The output of the Pilot Despreader 12101 is multiplied by the output of the Multi-Code Walsh generator 1212 (in a complex sense, and once each tick within a Walsh chip clock cycle) and added, in accumulator 1203, to the register of the associated correlator 1204–1209. The timing generator 1210 coordinates which of the Walsh codes is selected and which register to update during each tick. The timing generator 1202 controls multiplexer 1213 to correctly select the register output which is to be added, in accumulator 1203, to the output of Walsh despreader 1202 At the end of a Walsh Symbol, the registers of the six complex correlators 1204–1209 each contain the results of the correlations.

Figure 14:
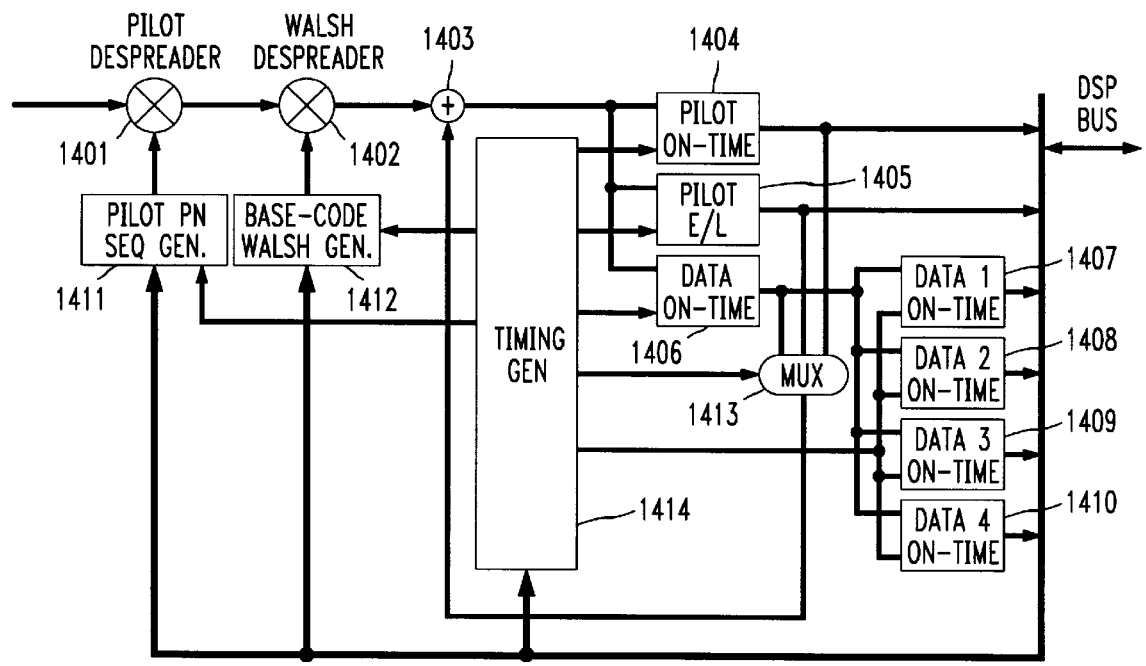
FIG. 14 shows a block diagram for a shared correlator circuit used with selected Walsh codes and a FWHT implemented in DSP software.

As mentioned, it is also possible to combine the shared accumulator enhancement to the FWHT enhanced MC-CDMA receiver of FIG. 8, to further reduce circuit size. A block diagram of such a system is shown in FIG. 14. In this block diagram the channel estimate multiplication (complex) and FWHT (real) is assumed to be implemented in the DSP (not shown) that connects to the DSP bus.

Figure 15:
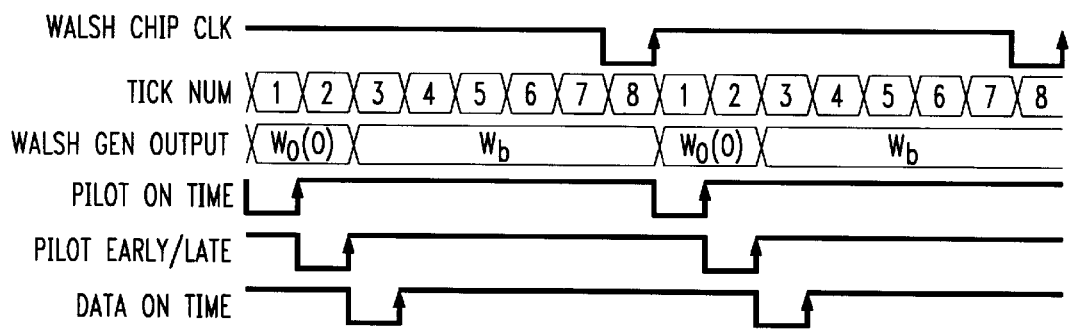
FIG. 15 shows the timing diagram for the circuit of FIG. 14.

The Base-Code Walsh generator 1412 creates both the "Pilot" Walsh code ($W_0$) and the base Walsh code ($W_b$) at the same time. For each "tick" within a Walsh chip clock cycle, it generates either pilot Walsh code (all zeroes) and then one chip of the base Walsh code. The output of the Pilot Despreader 1401 is multiplied, in Walsh despreader 1402, by the output of the Base-Code Walsh generator 1412 (also in a complex sense, and once each tick within a Walsh chip). The timing generator 1414 coordinates which of the two Walsh codes is selected and which correlator 1404–1410 register to update during each tick. The registers of the pilot-on time and pilot-early/late correlators 1404–1405 accumulate the correlation values over an entire Walsh symbol of Nc chips. The Data-on-time correlator 1406 register accumulates the correlation values over Nc/N chips (N is 4 in these figures) and the results of the intermediate accumulations (as described in the previous section) are buffered in the registers of the Data[1 . . . 4]-On-time correlators 1407–1410. Timing generator 1414 controls multiplexer 1413 to correctly select correlator 1404–1406 outputs to be added, in accumulator 1403, to the output of Walsh despreader 1402. A timing diagram for the control of this scheme shown in FIG. 15

As shown by the inputs I/Q in FIG. 12, the present invention allows for the possibility that the coherent link may contain independent information in the received I and Q channels. In that case, a slightly different complex correlator using complex Walsh codes may be used to distinguish the data on the I and Q channels independently, thus further doubling the user data rate. The teaching of the present invention still applies to such a configuration because the timing of the received I and Q channels is the same. For this reason, the teaching of the present invention may be applied to other CDMA systems.

The teaching of the present invention may also be utilized in a receiver of a non-coherent MC-CDMA. In such an application, there is no pilot channel used as a phase reference embedded in the signal and thus the timing is derived directly from the data signal. For further details see the description of the MC-CDMA receiver in the previously-identified patent application entitled "AN IMPROVED MULTI-CODE CODE DIVISION MULTIPLE ACCESS RECEIVER," by C.-L. I, C. A. Webb III, and A. Partyka.

For a non-coherent MC-CDMA receiver, channelization is achieved by subcode concatenation based on the user specific long code as described in the above-identified U.S. Pat. No. 5,442,625. The subcodes are orthogonal to each other and can be considered to be analogous to the Walsh codes in the coherent case. In the same way the long code spreading in the non-coherent link is analogous to the PN-short code spreading of the coherent link. Therefore, the same simplification of the data correlators in a non-coherent MC-CDMA receiver can be applied if properly chosen subcodes are used. Since the subcode generation is arbitrary, with the only constraint of orthogonality, it can easily meet the previously-described relationship $$W(k,i) = W_{k+i\, Nc/N}$$

for selecting codes.
The data correlator part remains the same for the non-coherent case. The major difference is that in the non-coherent case we do not have a channel weighting (804, 805, 808, 81 1, and 814 ). That means that there is no multiplication of the N correlator outputs with a channel estimate but a squaring operation to obtain an energy measurement. Hence, the further simplification shown in FIG. 10 is only possible for coherent links.

While our inventive MC-CDMA receiver has been described for use in a forward link utilizing a Walsh code pilot frequency and Walsh encoding to provide coherent operation, it should be noted that many other well known codes which maintain coherent operations may also be utilized in both the MC-CDMA transmitter and MC-CDMA receiver (typically in the forward link). Similarly, while our MC-CDMA receiver has been described for use in a non-coherent reverse link utilizing a user Long PN code via subcode concatenation, it should be noted that many other well known codes which provide non-coherent operations may also be utilized in both the MC-CDMA transmitter and MC-CDMA receiver (typically in the reverse link). Moreover, changing the operation of the forward link and reverse link from coherent and non-coherent, respectively, to noncoherent and coherent, does not affect the operation of the receivers.

Additionally, while our MC-CDMA receiver has been described for use in forward and reverse link systems which utilize mutually orthogonal signal codes, it should be understood that our invention may also be used in forward and reverse link systems which use non-orthogonal signal codes.

What has been disclosed is merely illustrative of the present invention. Other arrangements can be implemented by those skilled in the art without departing from the spirit and scope of the present invention.

We claim:

1. A multicode (MC) code division multiple access (CDMA) receiver comprising rake receiver means for receiving and demodulating a MC-CDMA signal including N (where N>1) encoded signal channels into N signal samples, a common logic circuit for time-sharing an accumulator, for accumulating the timing information of the N signal samples, among a plurality of correlator means, and each of the plurality of correlator means either utilizes the sample accumulation from each of the N signals from the time-shared accumulator for decoding an associated one of the N signal channels, or utilizes the sample accumulation from each of the N signals from the time-shared accumulator for tracking and acquiring timing information for a preselected channel of the MC-CDMA-signal.

2. The multicode MC-CDMA receiver of claim 1 further including first correlator means for tracking and acquiring timing information for a preselected channel of the MC-CDMA signal, and wherein each of the second correlator means utilizes the acquired timing information from the first correlator means for decoding an associated one of the N signal channels.

3. The multicode MC-CDMA receiver of claim 2 further including a common logic circuit which is time-shared between the first correlator means and the second correlator means.

4. The multicode MC-CDMA receiver of claim 2 further including a separate common logic circuit for each of the first correlator means and the second correlator means.

5. The multicode MC-CDMA receiver of claim 2 wherein each of the second correlator means includes a FWHT decoder.

6. The multicode MC-CDMA receiver of claim 2 wherein the plurality of second correlator means share a FWHT implemented as part of a digital signal processor which processes output signals from the plurality of second correlators.

7. The multicode MC-CDMA receiver of claim 1 wherein the plurality of second correlator means further includes at least two correlators selected from a group of correlators comprising a pilot-on-time correlator, a pilot-early/late correlator, a plurality of data-on-time correlators, and a data-early/late correlator.

8. The multicode MC-CDMA receiver of claim 1 being coherent and wherein the plurality of correlators means further includes at least two correlators selected from a group of correlators comprising a pilot-on-time correlator, a pilot-early/late correlator, and a plurality of data-on-time correlators.

9. The multicode MC-CDMA receiver of claim 1 being non-coherent and wherein the plurality of correlator means further includes at least two correlators selected from a group of correlators comprising a plurality of data-on-time correlator, and a data-early/late correlator.

10. The multicode MC-CDMA receiver of claim 1 further including a multi-code Walsh generator shared among the N signal channels for generating the N signal samples.

11. The multicode MC-CDMA receiver of claim 1 further including a base-code Walsh generator shared among the N signal channels for generating the N signal samples.

12. A method of operating a multicode (MC) code division multiple access (CDMA) receiver comprising the steps of:

receiving and demodulating a MC-CDMA signal including N (where N>1) encoded signal channels into N signal samples, time-sharing an accumulator, for accumulating the timing information of the N signal samples, among a plurality of correlator means, and at each of the plurality of correlator means, utilizing the sample accumulation from each of the N signals from the accumulator time-sharing step for decoding an associated one of the N signal channels, or utilizing the sample accumulation from each of the N signals from the accumulator time-sharing step for tracking and acquiring timing information for a preselected channel of the MC-CDMA-signal.

* * * * *